(12) United States Patent
Akita et al.

(10) Patent No.: US 9,960,713 B2
(45) Date of Patent: May 1, 2018

(54) IMPACT PRODUCING ACTUATOR AND TOUCH PANEL

(71) Applicant: SMK Corporation, Tokyo (JP)

(72) Inventors: Yuki Akita, Kanagawa (JP); Yoshinori Watanabe, Kanagawa (JP); Katsuhito Fujii, Tokyo (JP); Takeshi Matsuda, Kanagawa (JP)

(73) Assignee: SMK Corporation, Tokyo (JP)

( * ) Notice: Subject to any disclaimer, the term of this patent is extended or adjusted under 35 U.S.C. 154(b) by 103 days.

(21) Appl. No.: 14/874,470

(22) Filed: Oct. 5, 2015

(65) Prior Publication Data

US 2016/0028326 A1     Jan. 28, 2016

Related U.S. Application Data

(63) Continuation of application No. PCT/JP2014/082184, filed on Nov. 28, 2014.

(30) Foreign Application Priority Data

Jul. 3, 2014  (JP) ................................. 2014-138034

(51) Int. Cl.
*H02N 1/00* (2006.01)
*G06F 3/041* (2006.01)
(Continued)

(52) U.S. Cl.
CPC ................. *H02N 1/00* (2013.01); *F03G 7/06* (2013.01); *G06F 3/016* (2013.01); *G06F 3/041* (2013.01)

(58) Field of Classification Search
CPC ........... H02N 1/00; G06F 3/016; G06F 3/041; F03G 7/06
See application file for complete search history.

(56) References Cited

U.S. PATENT DOCUMENTS

2001/0015668 A1*  8/2001  Sakamoto ............... H03F 1/306
                                                              327/307
2003/0079472 A1    5/2003  Hara et al.
(Continued)

FOREIGN PATENT DOCUMENTS

CN      103197707 A    7/2013
CN      103684361 A    3/2014
(Continued)

OTHER PUBLICATIONS

Office Action issued for counterpart Taiwanese Application 103141974, issued by Taiwan Intellectual Property Office dated Sep. 14, 2016.
(Continued)

*Primary Examiner* — Abhishek Sarma

(57) ABSTRACT

An impact producing actuator can vary energy to be applied to a shape memory alloy, depending on, for example, an ambient temperature. The impact producing actuator has a drive signal generation unit that generates a drive signal based on a single pulse signal generated in response to an input operation and outputs the drive signal, a switching element whose switching operation is controlled by the drive signal, and a shape memory alloy through which electric current passes for a period of time during which the switching element is turned on or off. The impact producing actuator is configured such that the period of time during which the switching element is turned on or off varies depending on the ambient temperature.

4 Claims, 18 Drawing Sheets

(51) Int. Cl.
*F03G 7/06* (2006.01)
*G06F 3/01* (2006.01)

(56) References Cited

U.S. PATENT DOCUMENTS

| | | | |
|---|---|---|---|
| 2004/0220713 A1* | 11/2004 | Kaster | B60T 8/173 |
| | | | 701/36 |
| 2011/0043454 A1 | 2/2011 | Modarres et al. | |
| 2012/0212442 A1 | 8/2012 | Uchida et al. | |
| 2013/0145760 A1 | 6/2013 | Gondo | |
| 2014/0202843 A1 | 7/2014 | Matsuda et al. | |
| 2016/0209670 A1 | 7/2016 | Brown et al. | |

FOREIGN PATENT DOCUMENTS

| | | | |
|---|---|---|---|
| JP | S60-135673 A | 7/1985 |
| JP | S61-21820 A | 1/1986 |
| JP | 2000-110709 A | 4/2000 |
| JP | 4553725 B2 | 9/2010 |

OTHER PUBLICATIONS

International Search Report for International Patent Application No. PCT/JP2014/082184, issued by the Japan Patent Office dated Feb. 24, 2015.
Extended European Search Report for European Patent Application No. 14887709.5, issued by the European Patent Office dated Nov. 3, 2017.

* cited by examiner

IMPACT PRODUCING ACTUATOR AND TOUCH PANEL

CROSS REFERENCE TO RELATED APPLICATION

The contents of the following Japanese patent application and International patent application are incorporated herein by reference, Japanese Patent Application NO. 2014-138034 filed on Jul. 3, 2014, and International Patent Application NO. PCT/JP2014/082184 filed on Nov. 28, 2014.

FIELD

The present invention relates to an impact producing actuator and a touch panel, and, for example, an impact producing actuator and a touch panel using a shape memory alloy the shape of which varies by the passage of electric current therethrough.

BACKGROUND

There are conventionally known actuators using a shape memory alloy (hereinafter abbreviated as "SMA" as necessary), which expands and contracts depending on variations in temperature (refer to Patent Literature 1, for example).

CITATION LIST

Patent Literature

Patent Literature 1: Japanese Patent No. 4553725

SUMMARY

Technical Problem

In the conventional actuators using the SMA, electric current passes through the SMA for a fixed period of time, in other words, the SMA is heated by a fixed amount of energy, and hence there is a possibility that the desired operation of the SMA cannot be obtained.

Thus, one of objects of the present invention is to provide a new and useful impact producing actuator and touch panel that can solve the above problem.

Solution to Problem

To solve the above problem, a first aspect of the present invention is, for example, an impact producing actuator including:

a drive signal generation unit for generating a drive signal based on a single pulse signal generated in response to an input operation, and outputting the drive signal;

a switching element whose switching operation is controlled by the drive signal; and a shape memory alloy through which electric current passes for a period of time during which the switching element is turned on or off.

The impact producing actuator is configured such that the period of time during which the switching element is turned on or off varies depending on an ambient temperature.

A second aspect of the present invention is, for example, a touch panel including:

an input unit for receiving an input operation;

a signal generation unit for generating a single pulse signal in response to the input operation;

a drive signal generation unit for generating a drive signal based on the single pulse signal and outputting the drive signal;

a switching element whose switching operation is controlled by the drive signal; and a shape memory alloy through which electric current passes for a period of time during which the switching element is turned on or off.

The touch panel is configured such that the period of time during which the switching element is turned on or off varies depending on an ambient temperature.

According to at least one of embodiments, energy (the amount of heat) to be applied to the SMA to heat the SMA by passing electric current through the SMA can be made variable.

DESCRIPTION OF EMBODIMENTS

An embodiment of the present invention will be described below with reference to the drawings. The description will be given in the following sequence:
1. Embodiment
2. Modification examples The embodiment and the like described below are preferable concrete examples of the present invention, but do not limit the contents of the present invention. Moreover, the effects described below are just an example, and do not limit the contents of the present invention.

1. Embodiment

[Configuration of Common Actuator]

Figure 1:
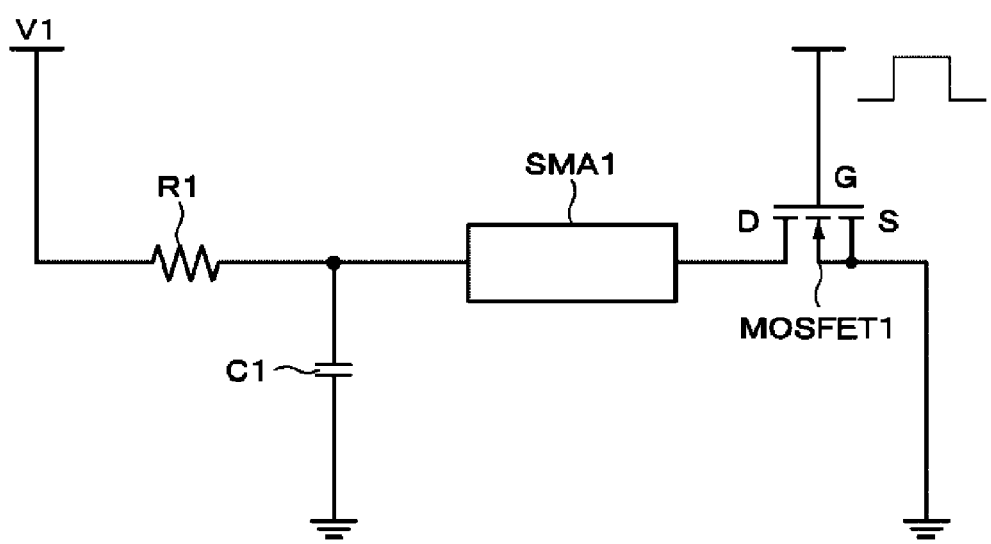
FIG. 1 is a diagram showing an example of a configuration of a common actuator.

First, the configuration of a common actuator will be described for the purpose of ease of understanding of the present invention. It is noted that a configuration including an SMA, a drive circuit for switching the passage of electric current through the SMA, and the like is collectively called an actuator in the following description. FIG. 1 shows an example of the configuration of the common actuator (actuator 1). A voltage V1 is supplied as a drive voltage to the actuator 1. The voltage V1 is applied to one end of a resistor R1, and the other end of the resistor R1 is connected to an SMA1. One end of a capacitor C1 is connected to a node between the resistor R1 and the SMA1, while the other end of the capacitor C1 is grounded.

A switching element is connected to the SMA1. The switching element is, for example, an N-channel type MOSFET (metal oxide field effect transistor). The drain (D) of the MOSFET1 is connected to the SMA1, and the source (S) of the MOSFET1 is grounded. To the gate (G) of the MOSFET1, a single pulse signal is inputted to control the switching operation of the MOSFET1. The MOSFET1 is turned on when the single pulse signal is at a high level (for example, 5 V (volts) in terms of voltage), while the MOSFET1 is turned off when the single pulse signal is at a low level (for example, 0 V in terms of voltage).

Turning on and off the MOSFET1 is controlled to switch the passage of electric current through the SMA1. For example, for a period of time during of which the MOSFET1 is turned on, the electric current passes through the SMA1 by a discharge from the capacitor C1 and thus the SMA1 is heated. The heating by the passage of the electric current contracts the SMA1. For a period of time during of which the MOSFET1 is turned off, the passage of the electric current through the SMA1 is stopped to stop heating. Cooling with outside air expands the SMA1.

In the common actuator 1 shown in FIG. 1, the period of time for the discharge from the capacitor C1, that is, a period of time during which the single pulse signal is at the high level is fixed, and hence energy to be applied to the SMA1 is fixed. There is no problem if a temperature (hereinafter called ambient temperature as appropriate; the ambient temperature is also referred to as environmental temperature) around the SMA1 is always kept constant, but the ambient temperature of the SMA1 varies in general. Thus, provided that the duty ratio of the single pulse signal is set on the basis of a room temperature (for example, 25° C.), if the ambient temperature is lower than the room temperature, the time required to contract the SMA1 may increase or the amount of contraction may decrease due to insufficient heating. On the other hand, if the ambient temperature is higher than the room temperature, the time required to contract the SMA1 may decrease or excessive heating may occur.

Figure 2:
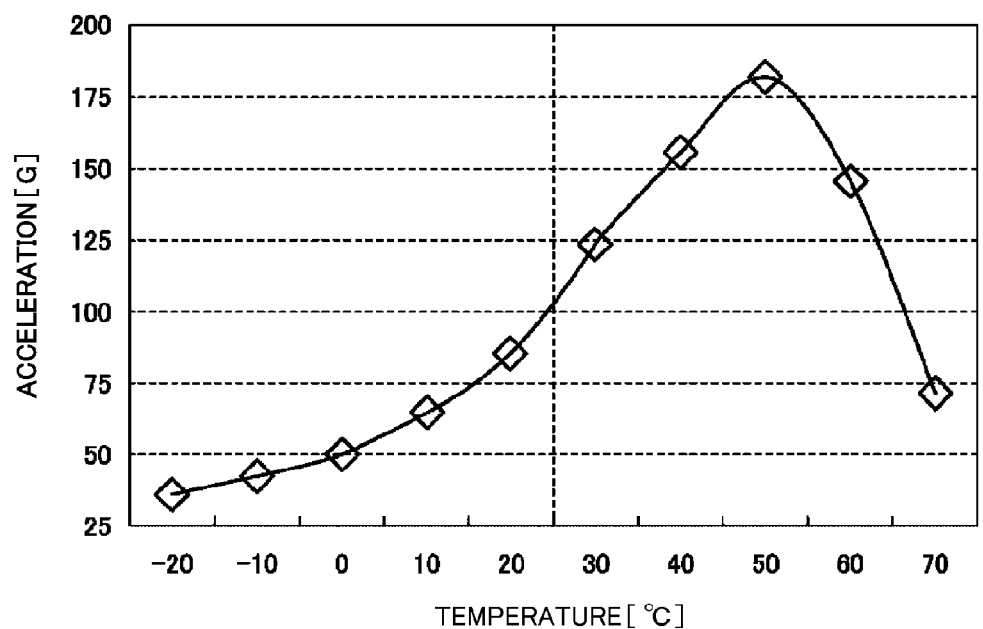
FIG. 2 is a graph for explaining the temperature characteristics of the common actuator.

FIG. 2 shows an example of the temperature characteristics of the common actuator. In FIG. 2, a horizontal axis represents the ambient temperature, and a vertical axis represents acceleration (G). It is noted that the acceleration is expressed in an arbitrary unit based on, for example, an acceleration (being 100) at 25° C. A concrete method for measuring the acceleration will be described later. As shown in FIG. 2, in the case of the common actuator, since the single pulse signal is at the high level for a fixed period of time, the acceleration tends to be smaller than a reference value at low temperatures, while the acceleration tends to be greater than the reference level at high temperatures. If the acceleration varies and the operation of the actuator varies depending on the ambient temperature as described above, the operation of equipment having the actuator also varies depending on the ambient temperature. Therefore, it is desirable that the acceleration be as constant as possible independent of the ambient temperature, or the difference between a maximum value and a minimum value of the acceleration be as small as possible. Considering the problem described above, the embodiment and the like according to the present invention will be hereinafter described in detail.

[Measurement Method for Acceleration]

First, an example of the measurement method for the acceleration in this description will be given with reference to FIG. 3. Note that, the following measurement method for the acceleration considers equipment (for example, touch panel) to which the actuator is applied, but the measurement method for the acceleration is not limited to the method described below. The characteristics of the actuator may be defined by another parameter.

Figure 3:
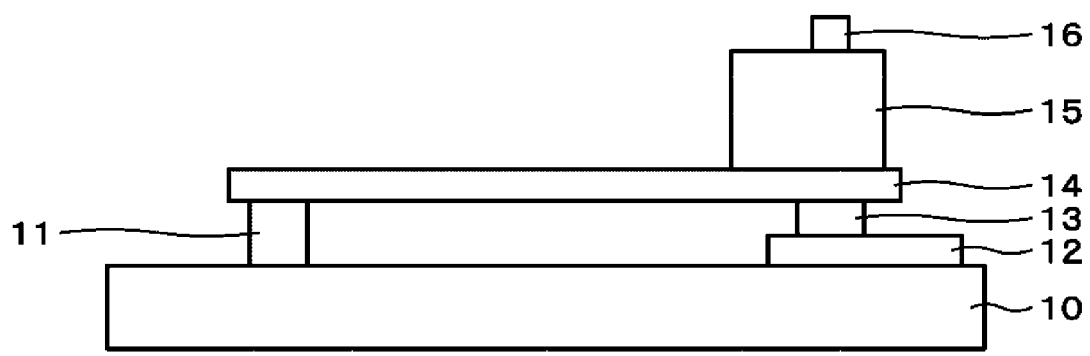
FIG. 3 is a diagram for explaining an example of a measurement method for acceleration.

As shown in FIG. 3, a brass plate 10 is put on a flat surface. The thickness of the brass plate 10 is set at, for example, 30 mm (millimeters). A rubber foot 11 is mounted on the top surface of the brass plate 10. A PWB (printed wiring board) 12 is also mounted on the top surface of the brass plate 10, and an actuator 13 is mounted on the PWB 12. It is configured such that the thickness of the rubber foot 11 is the same as or similar to the sum of those of the PWB 12 and the actuator 13, and the rubber foot 11, the actuator 13, etc. are configured to support end portions of a touch panel 14. The thickness of the touch panel 14 is set at, for example, 0.7 mm.

A weight 15 is mounted on the touch panel 14, and an acceleration sensor 16 is mounted on the weight 15. The weight 15 is, for example, 100 g (grams). As the acceleration sensor 16, a well-known sensor can be employed. The weight 15 and the acceleration sensor 16 are disposed such that the center lines of the actuator 13, the weight 15, and acceleration sensor 16 coincide or substantially coincide with each other. The acceleration is measured with such an acceleration measurement jig having the structure described above. More specifically, while varying the ambient temperature, an SMA in the actuator 13 is heated by passing electric current through the SMA. The acceleration sensor 16 measures the acceleration owing to the expansion and contraction of the SMA.

[Configuration of Actuator]

Figure 4:
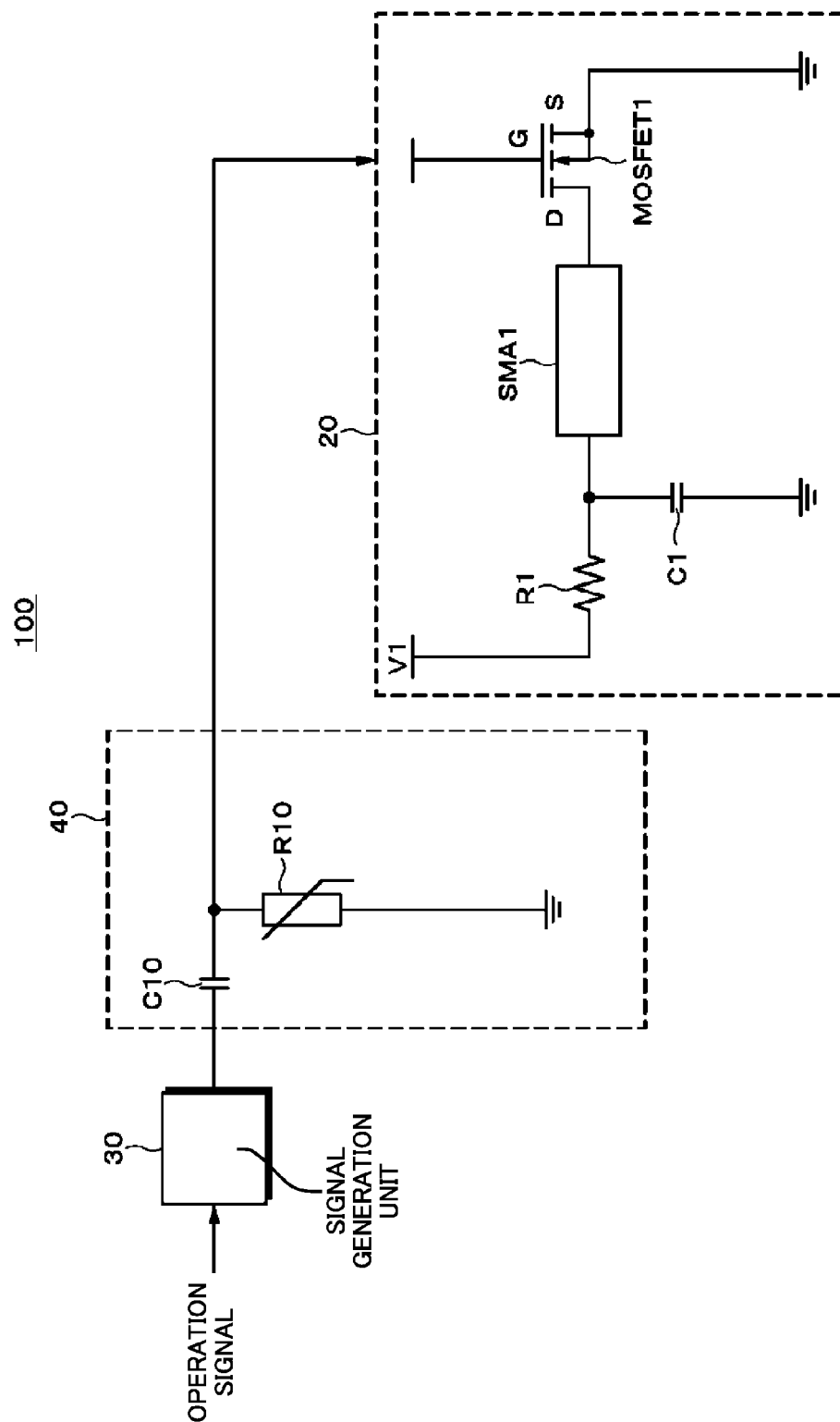
FIG. 4 is a diagram showing an example of a configuration of an actuator according to an embodiment of the present invention.

FIG. 4 shows an example of a configuration of an actuator (actuator 100) according to an embodiment of the present invention. The actuator 100 is applicable to, for example, a touch panel. Out of the configuration of the actuator 100 shown in FIG. 4, part thereof enclosed with dashed lines 20 has the same configuration as the common actuator described above, and hence the repetitive description thereof will be omitted.

The actuator 100 has, for example, a signal generation unit 30 and a drive signal generation unit 40 in addition to the configuration enclosed by the dashed lines 20. The signal generation unit 30 generates the single pulse signal in response to an operation signal, and outputs the generated single pulse signal to the drive signal generation unit 40. The operation signal to be inputted to the signal generation unit 30 is, for example, a signal generated in response to a touch operation on the touch panel.

The drive signal generation unit 40 is composed of, for example, a differentiating circuit (high-pass filter) having a capacitor C10 and a resistor R10 (first resistor) the resistance of which varies depending on the ambient temperature. The resistor R10 can be a thermistor with negative characteristic i.e. an NTC (negative temperature coefficient), the resistance of which decreases with increase in temperature.

Figure 5:
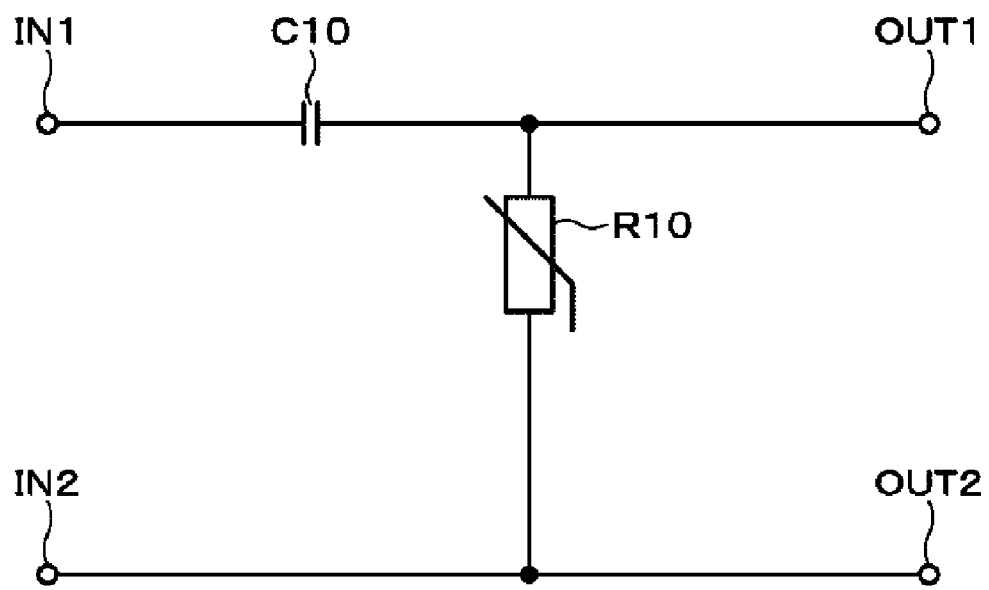
FIG. 5 is a diagram for explaining an example of a configuration of a drive signal generation unit.

FIG. 5 is a diagram that explains an example of the concrete configuration of the drive signal generation unit 40. In FIG. 5, the drive signal generation unit 40 is represented as a circuit having four terminals. The drive signal generation unit 40 has a pair of input terminals IN1 and IN2 and a pair of output terminals OUT1 and OUT2. A common potential line is formed by applying a common potential (for example, ground potential) to the input terminal IN2 and the output terminal OUT2. As shown in the drawing, the capacitor C10 is connected between the input terminal IN1 and the output terminal OUT1. An intermediate point between the capacitor C10 and the output terminal OUT1 is connected to the common potential line through the resistor R10.

The drive signal generation unit 40 generates a drive signal on the basis of the single pulse signal inputted from the signal generation unit 30. Then, the drive signal generation unit 40 outputs the generated drive signal to the MOSFET1. The switching operation of the MOSFET1 is controlled in accordance with the drive signal generated by and outputted from the drive signal generation unit 40.

[Operation of Actuator]

Figure 6:
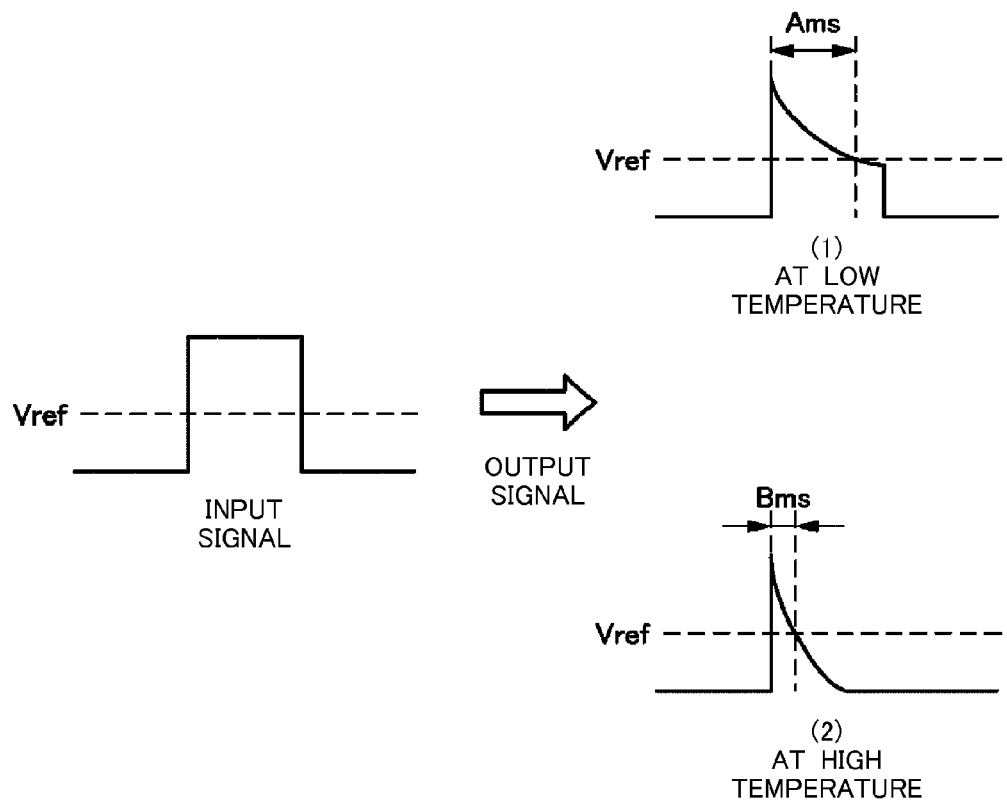
FIG. 6 is a diagram for explaining an example of variation of a single pulse signal.

Next, an example of the operation of the actuator 100 will be described. FIG. 6 is a diagram showing, as an input signal, an example of the single pulse signal generated by the signal generation unit 30. Note that, a reference voltage Vref, which is indicated by a dashed line, represents a threshold value at which the MOSFET1 is turned on. That is to say, the MOSFET1 is turned on when a voltage higher than the reference voltage Vref is applied to the gate of the MOSFET1.

The single pulse signal is inputted to the drive signal generation unit 40 as the input signal. The drive signal is outputted from the drive signal generation unit 40 as an output signal. FIG. 6 schematically shows the waveform of the drive signal at temperatures (low temperatures) lower than the room temperature, and the waveform of the drive signal at temperatures (high temperatures) higher than the room temperature.

The resistor R10 of the drive signal generation unit 40 has an increased resistance at the low temperatures. In other words, since a time constant τ represented by the product of the capacitance of the capacitor C10 and the resistance of the resistor R10 is increased, a falling edge of the drive signal becomes gentle. By making the falling edge of the drive signal gentle, a period of time Ams during which the level of the drive signal is higher than the reference voltage Vref can be made long. In other words, it is possible to elongate the period of time during which the MOSFET1 is turned on, and the period of time during which the electric current is passed through the SMA1.

On the other hand, the resistor R10 of the drive signal generation unit 40 has a decreased resistance at the high temperatures. In other words, since the time constant τ represented by the product of the capacitance of the capacitor C10 and the resistance of the resistor R10 decreases, the falling edge of the drive signal becomes sharp. By sharpening the falling edge of the drive signal, a period of time Bms during which the level of the drive signal is higher than the reference voltage Vref can be made short. In other words, it is possible to shorten the period of time during which the MOSFET1 is turned on, and the period of time during which the electric current is passed through the SMA1. Therefore, it is possible to prevent lack of heating of the SMA1 at the low temperatures and excessive heating of the SMA1 at the high temperatures.

Figure 7:
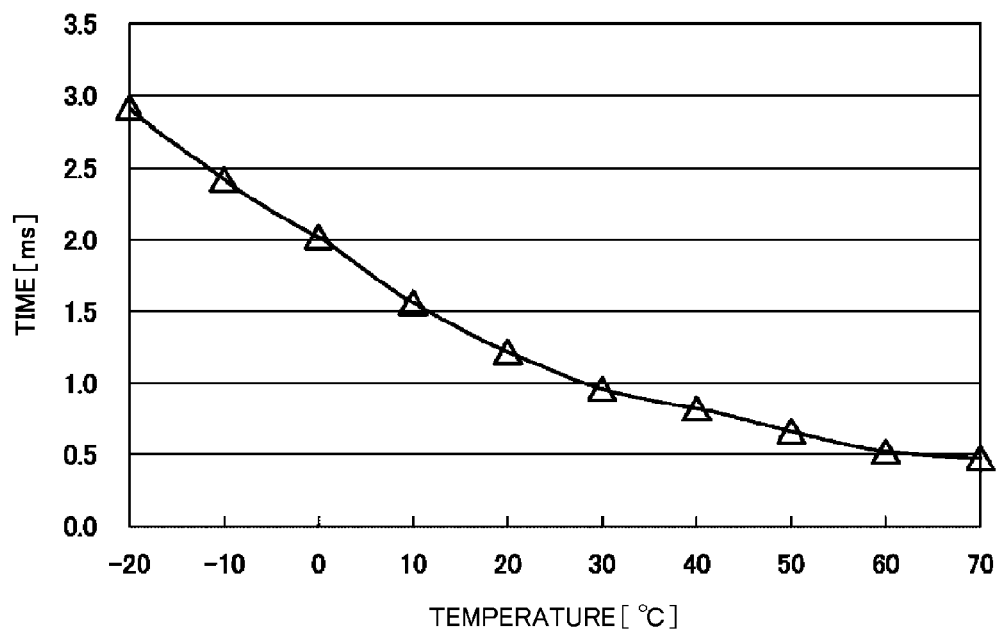
FIG. 7 is a graph for explaining an example of the relationship between a period of time during which the level of a drive signal is higher than a reference voltage and an ambient temperature.

FIG. 7 is a diagram showing an example of the period of time during which the level of the drive signal is higher than the reference voltage Vref. In FIG. 7, a vertical axis shows the period of time during which the level of the drive signal is higher than the reference voltage Vref (also the period of time during which the MOSFET1 is turned on and the period of time during which the electric current is passed through the SMA1), and a horizontal axis shows the ambient temperature. As shown in the drawing, the higher the ambient temperature, the shorter the period of time during which the level of the drive signal is higher than the reference voltage Vref can be made, and the shorter the period of time during which the electric current is passed through the SMA1 can be made.

Figure 8A:
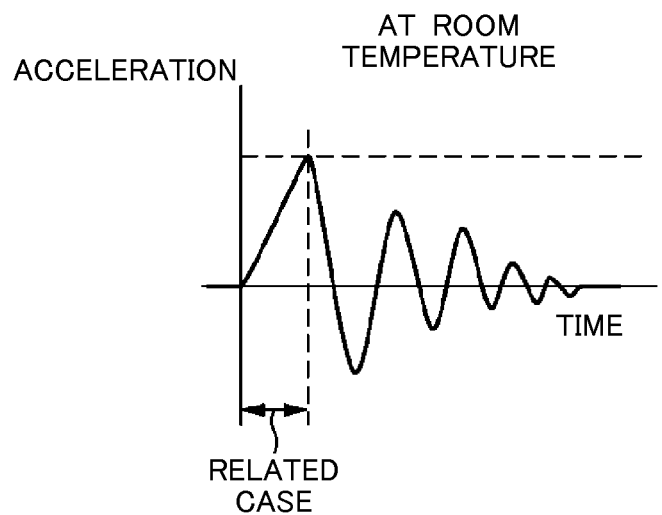
FIG. 8A is a diagram for explaining an example of an effect according to the embodiment of the present invention.
Figure 8B:
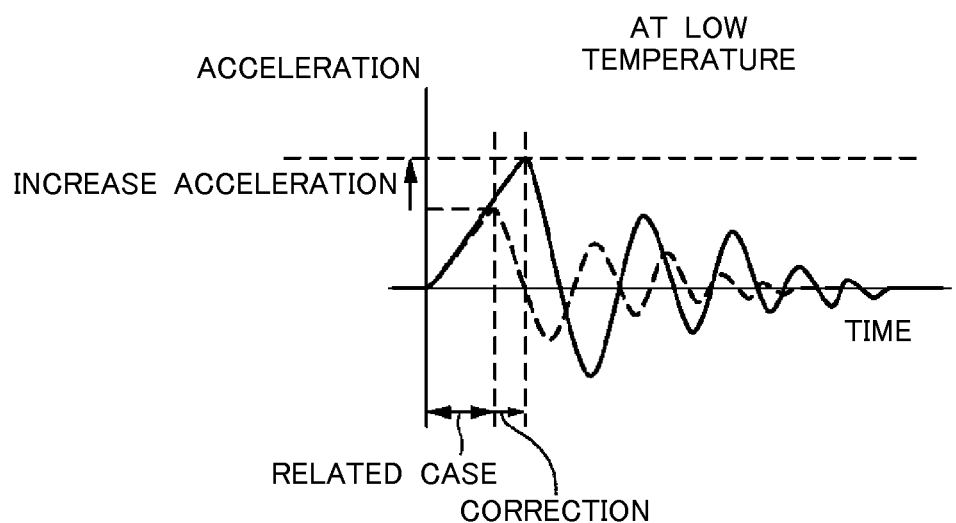
FIG. 8B is a diagram for explaining an example of an effect according to the embodiment of the present invention.
Figure 8C:
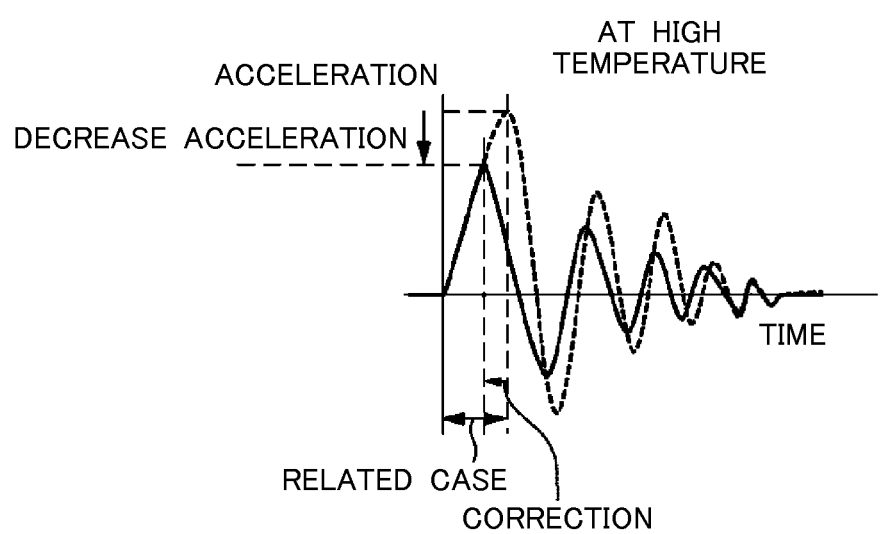
FIG. 8C is a diagram for explaining an example of an effect according to the embodiment of the present invention.

FIGS. 8A, 8B and 8C are diagrams showing an example of variations in the acceleration with time. FIG. 8A shows the example of the variations in the acceleration with time in a state that the ambient temperature is the room temperature (for example, 25° C.). FIG. 8B shows the example of the variations in the acceleration with time in a state that the ambient temperature is lower than the room temperature. FIG. 8C shows the example of the variations in the acceleration with time in a state that the ambient temperature is higher than the room temperature.

As described above, at the low temperatures, the period of time during which the electric current is passed through the SMA1 can be made long, and therefore energy (the amount of heat) to be applied to the SMA1 can be increased. Accordingly, as shown in FIG. 8B, the maximum value of the acceleration becomes higher than that in related case, to a level substantially equal to the maximum value of the acceleration at the room temperature. On the other hand, at the high temperatures, the period of time during which the electric current is passed through the SMA1 can be made short, and therefore energy (the amount of heat) to be applied to the SMA1 can be decreased. Thereby, as shown in FIG. 8C, the maximum value of the acceleration becomes lower than that in related case, to a level substantially equal to the maximum value of the acceleration at the room temperature.

Figure 9:
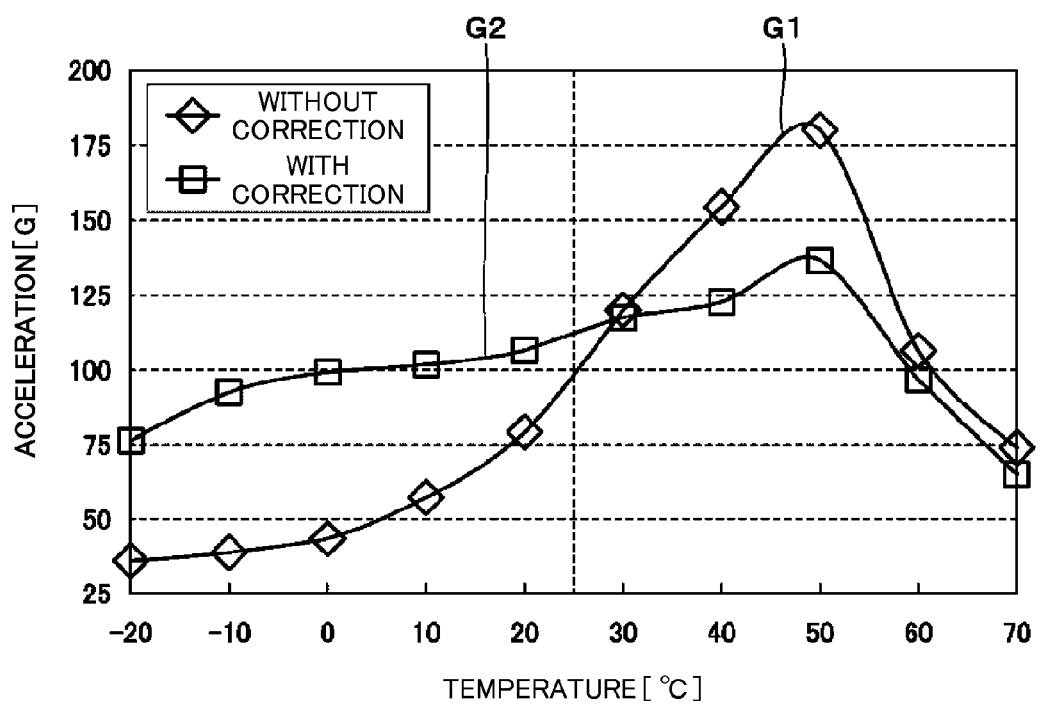
FIG. 9 is a graph for explaining the example of the effect according to the embodiment of the present invention.

FIG. 9 is a graph that explains an example of the effect according to the embodiment of the present invention. In FIG. 9, a horizontal axis represents the ambient temperature, and a vertical axis represents the acceleration. In FIG. 9, a line G1 with rhombus symbols represents an example of the temperature characteristics of the common actuator, just as with FIG. 2. A line G2 with square symbols represents an example of the temperature characteristics of the actuator that is subjected to a correction process according to the embodiment of the present invention. As is apparent from the graph, in the actuator according to the embodiment of the present invention, the acceleration is substantially kept constant independent of increase or decrease in the ambient temperature, as compared with the common actuator. It is noted that in FIG. 9, a decrease in the acceleration at 50° C. or higher is one of the characteristics of a Ti alloy, caused by the fact that the Ti alloy neither expand nor contract at a limit temperature or higher. This causes no practical problem if the actuator is not frequently used at 50° C. or higher.

[Concrete Form of Actuator]

Figure 10:
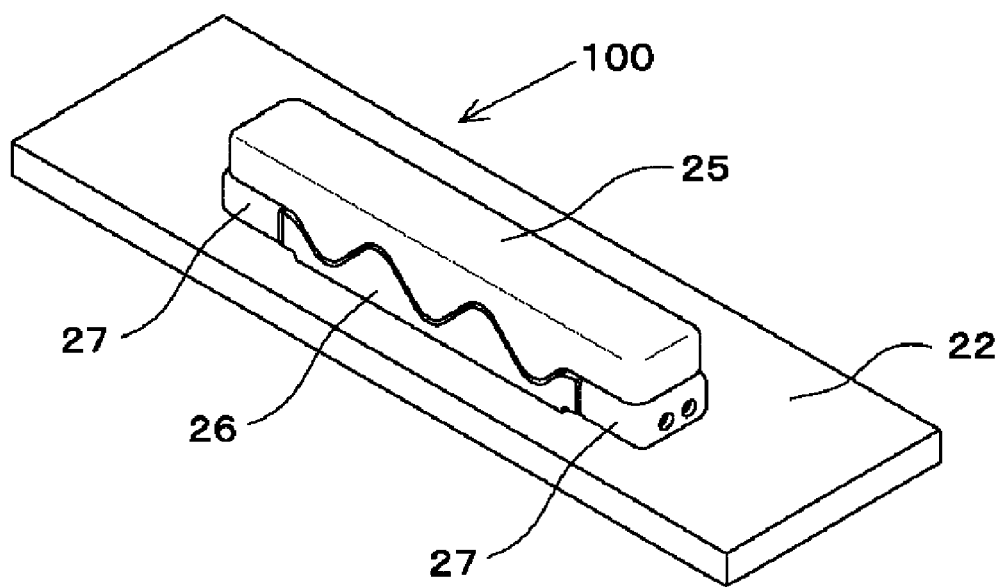
FIG. 10 is a diagram for explaining an example of the concrete configuration of the actuator according to the embodiment of the present invention.

Next, an example of the concrete form of the actuator will be described. Note that, the form of the actuator according to the present invention is not limited to a form described below. FIG. 10 shows the external appearance of the actuator 100. The illustrated actuator 100 is in an initial state before a displacement occurs. The actuator 100 is formed on a top surface of a printed wiring board 22.

The actuator 100 includes, for example, a movable member 25, a fixed member 26, two terminal fittings 27, and the SMA1 having the shape of, for example, a line. The movable member 25 and the fixed member 26 are both made of an insulating rigid material. The bottom surface of the movable member 25 and the top surface of the fixed member 26 are formed in the shape of waves fitted with each other, and the SMA1 is disposed between the waveform surfaces. It is noted that the movable member 25 and the fixed member 26 may be made of a conductive metal material or the like. In this case, it is necessary to provide a structure to prevent shorts between the two terminal fittings 27, such as insulating films provided on the respective surfaces of the movable member 25 and the fixed member 26.

The SMA1 is secured at both ends of the fixed member 26 by the terminal fittings 27. The SMA1 according to this embodiment is made of, for example, a nickel-titanium alloy as described above, and has a high conductivity, a relatively low resistance, and the shape of a flexible thread with an extremely narrow diameter in an environment around the room temperature. The passage of the electric current through the SMA1 generates heat in the SMA1 itself, and the heat hardens and contracts the SMA1 itself. It is noted that the SMA1 may be made of a metal or alloy, other than the nickel titanium alloy, as long as it has similar characteristics.

The terminal fittings 27 are fitted onto both the ends of the fixed member 26 together with the ends of the SMA1, so as to secure the ends of the SMA1 with a strength sufficient to prevent the SMA1 from being loose. The terminal fittings 27 are made of a conductive metal, and soldered to a land (not shown) in a predetermined shape provided on the printed wiring board 22. Thus, the fixed member 26 is secured on the printed wiring board 22.

Figure 11A:
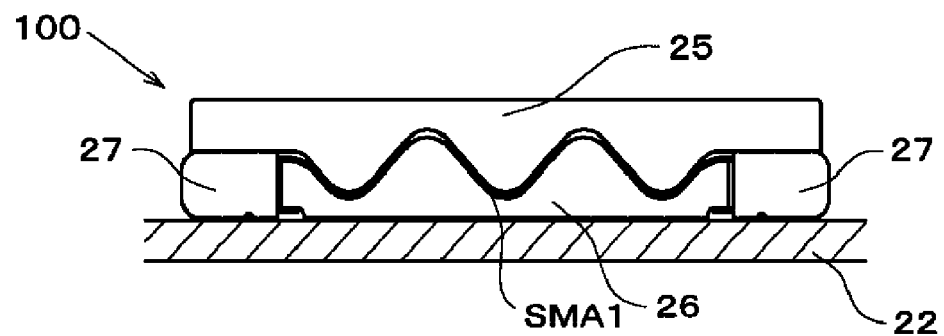
FIG. 11A is a diagram for explaining an example of the concrete operation of the actuator according to the embodiment of the present invention.

The operation of the actuator 100 will be described with reference to FIGS. 11A and 11B. FIG. 11A shows a state in which there is no passage of the electric current through the SMA1, in other words, a state before the displacement occurs. In this state, the SMA1 is soft and flexible. In this state, the movable member 25 and the fixed member 26 are in close proximity to each other with catching the SMA1 therebetween by, for example, an attractive force of a not-shown magnet.

Figure 11B:
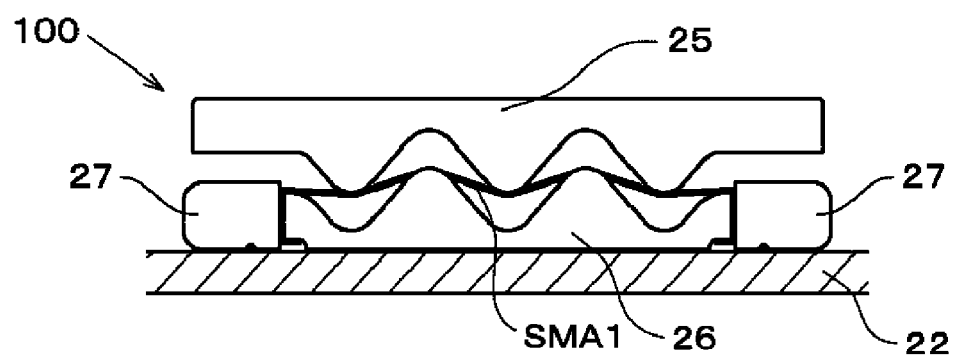
FIG. 11B is a diagram for explaining an example of the concrete operation of the actuator according to the embodiment of the present invention.

FIG. 11B shows a state in which there is the passage of the electric current through the SMA1, in other words, a state after the displacement of the actuator 100 occurs. In this state, the SMA1 contracts, and in conjunction with this, the movable member 25 is vertically displaced in a direction away from the fixed member 26 against the attractive force of the magnet. If a cover member (not illustrated in the drawing) is put on the movable member 25, the cover member is displaced together in the same direction.

When the passage of the electric current through the SMA1 is stopped from the state shown in FIG. 11B, the SMA1 is cooled by a temperature difference from the atmosphere and heat dissipation to the movable member 25, the fixed member 26, and the terminal fittings 27. The SMA1 thus returns to the same length as in the state in which there is no passage of the electric current therethrough, and quickly returns to the state shown in FIG. 11A by the action of the attractive force by the magnet.

For example, the actuator 100 is applied to the touch panel, and an input surface on which the touch operation is performed is formed on the movable member 25. When the touch operation is detected, the single pulse signal is generated, and the input surface is displaced once in one direction from the state of FIG. 11A to the state of FIG. 11B in response to the drive signal based on the single pulse signal. Therefore, an impact (a click feeling) can be transmitted to a user of the touch panel in response to the touch operation, allowing the user to be sure that the input operation is performed.

Applying the actuator according to the present invention to the touch panel can prevent a change in the feeling (click feeling) of the user due to a change of the ambient temperature, for example. Also, it is possible to prevent that when the ambient temperature is high, an increase in the acceleration generates an excessive load in the SMA and breaks the configurations of the SMA and the vicinity thereof.

2. Modification Examples

The embodiment of the present invention has been concretely described above. The present invention is not limited to the above embodiment, but can be variously modified. A plurality of modification examples will be described below. The matters described in the embodiment can be applicable to the modification examples, except where specifically noted.

[Modification Example 1]

Figure 12:
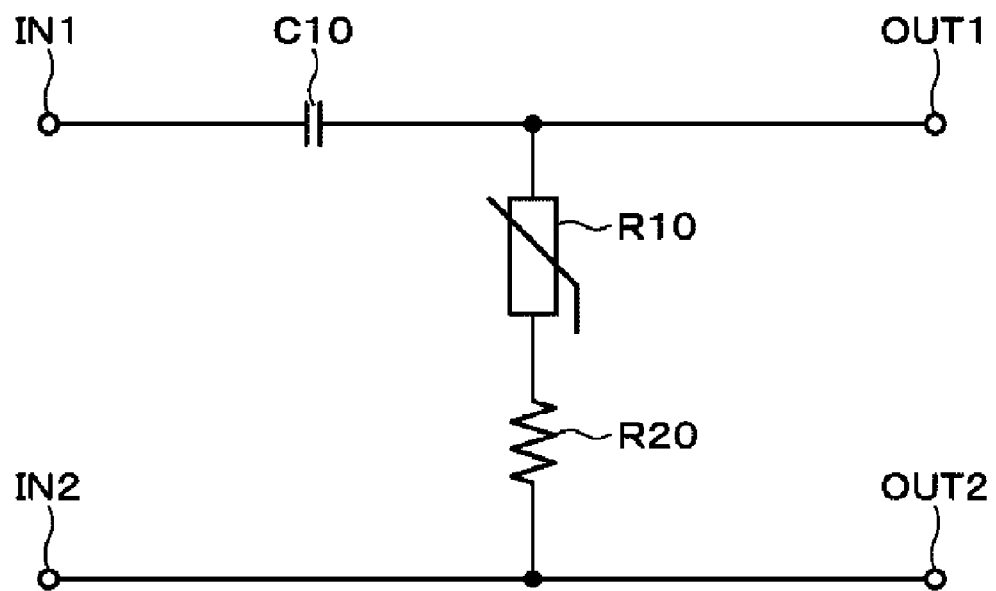
FIG. 12 is a diagram for explaining a modification example.

FIG. 12 is a diagram for explaining a modification example 1. FIG. 12 shows only the configuration of the drive signal generation unit, and the configuration of the other parts is omitted as appropriate. A drive signal generation unit 50 includes a resistor R20 (second resistor) connected to the resistor R10 in series, in addition to the configuration of the drive signal generation unit 40. That is, the intermediate point between the capacitor C10 and the output terminal OUT1 is connected to the common potential line through the resistor R10 and the resistor R20.

In the configuration having only the resistor R10, a pulse width (here, the period of time during which the level of the drive signal is higher than the reference voltage Vref) is adjusted using only the resistance of the resistor R10 (for example, thermistor). Thus, it sometimes becomes difficult to generate the drive signal having the pulse width that is suitable for correcting the temperature characteristics of the actuator. Accordingly, the resistance R20 is added as shown in FIG. 12. When the resistance R20 is added, the time constant $\tau$ of the drive signal generation unit 50 is represented by the product of the capacitance of the capacitor C10 and the sum (combined resistance) of the resistances of the resistors R10 and R20. Appropriately setting the resistance of the resistor R20 varies the time constant $\tau$, and thereby varies the degree of sharpness or gentleness of the falling edge of the drive signal. For example, the addition of resistor R20 increases the time constant $\tau$ and makes the falling edge of the drive signal gentle. In other words, it is possible to set the pulse width of the drive signal in an appropriate manner without depending only on the characteristics of the resistor R10.

[Modification Example 2]

Figure 13:
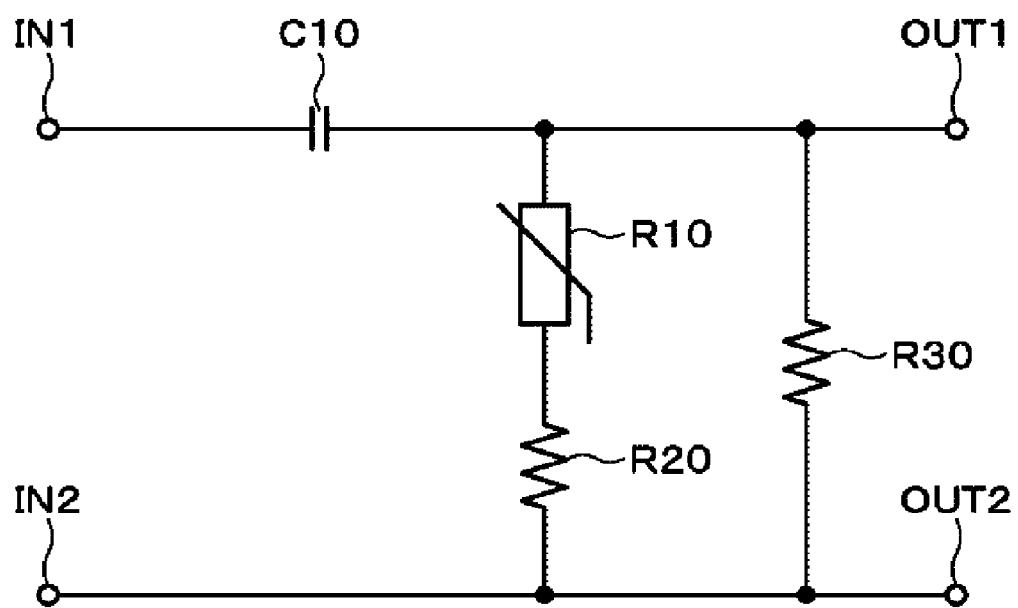
FIG. 13 is a diagram for explaining a modification example.

FIG. 13 is a diagram for explaining a modification example 2. FIG. 13 shows only the configuration of the drive signal generation unit, and the configuration of the other parts is omitted as appropriate. A drive signal generation unit 51 includes a resistor R30 (third resistor) connected in parallel with the resistors R10 and R20, in addition to the configuration of the drive signal generation unit 50. That is, the intermediate point between the capacitor C10 and the output terminal OUT1 is connected to the common potential line through the resistor R30, as well as through the resistors R10 and R20.

According to the configuration of the drive signal generation unit 51, just as with the drive signal generation unit 50, it is possible to vary the time constant τ and thereby vary the degree of sharpness or gentleness of the falling edge of the drive signal. In other words, it is possible to set the pulse width of the drive signal in an appropriate manner without depending only on the characteristics of the resistor R10. Note that, the resistor R30 is added to the configuration of the drive signal generation unit 50 in FIG. 13, but the resistor R30 may be added to the configuration of the drive signal generation unit 40.

[Modification Example 3]

Figure 14:
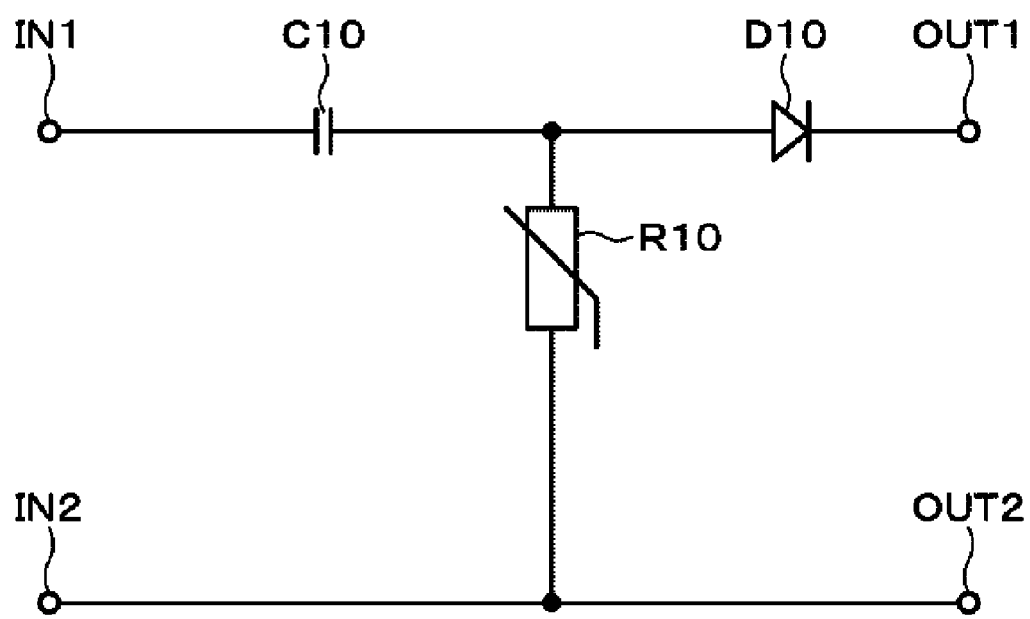
FIG. 14 is a diagram for explaining a modification example.
Figure 15:
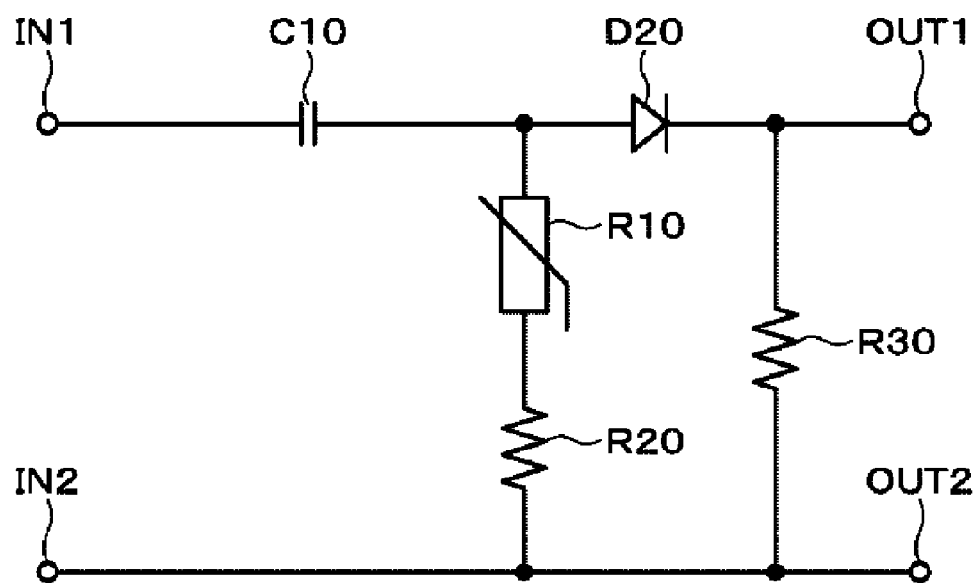
FIG. 15 is a diagram for explaining a modification example.

FIG. 14 is a diagram for explaining a modification example 3. FIG. 14 shows only the configuration of the drive signal generation unit, and the configuration of the other parts is omitted as appropriate. A drive signal generation unit 52 includes a diode D10, in addition to the configuration of the drive signal generation unit 40. For example, an anode of the diode D10 is connected to the capacitor C10, and a cathode of the diode D10 is connected to the output terminal OUT1. The drive signal generation unit 52 may cut a negative waveform using the rectification (half-wave rectification) function of the diode D10, as well as changes the waveform of the single pulse signal. As shown in FIG. 15, a diode D20 may be added to the configuration of the drive signal generation unit 51.

[Modification Example 4]

Figure 16:
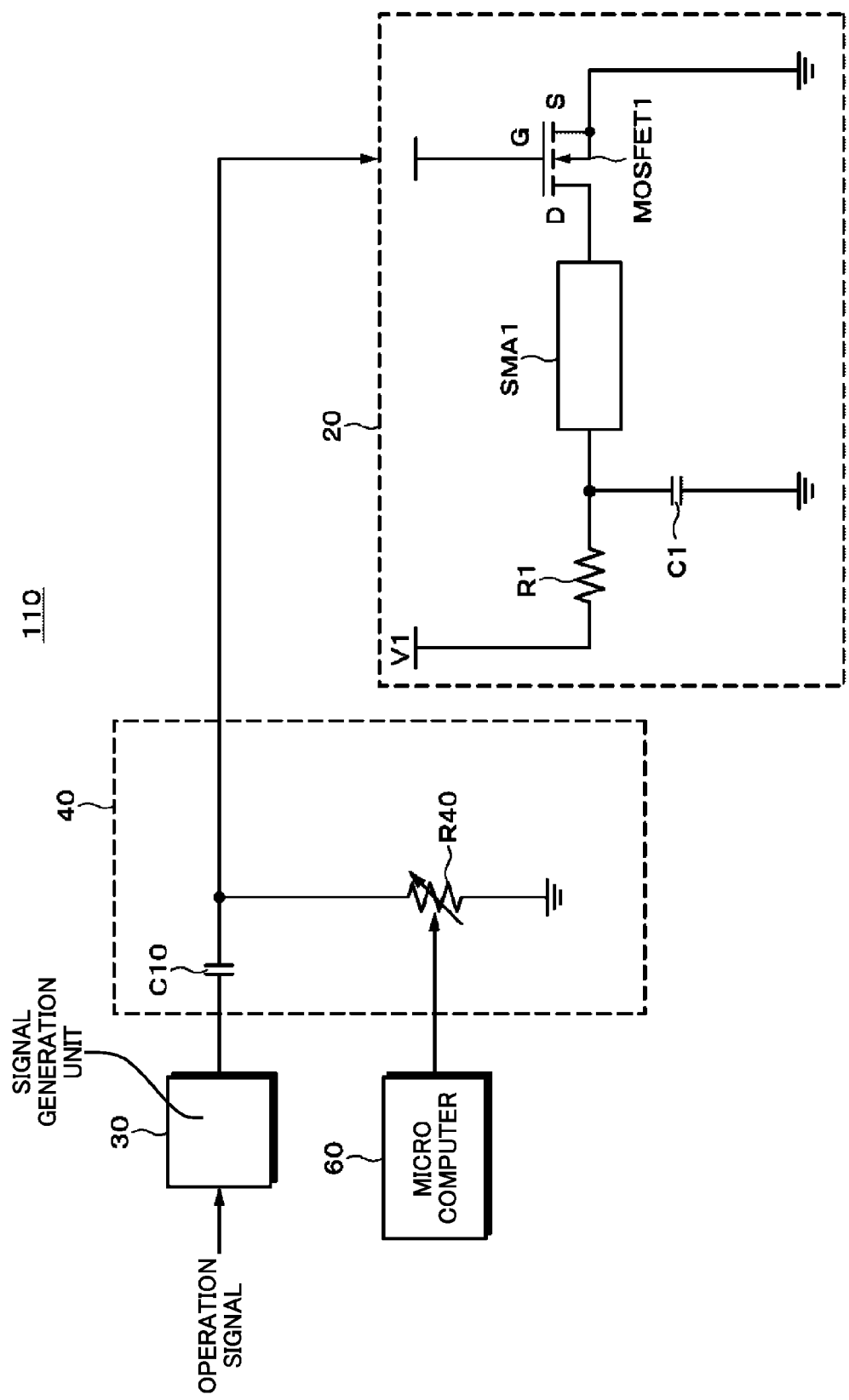
FIG. 16 is a diagram for explaining a modification example.

FIG. 16 is a diagram for explaining a modification example 4. An actuator (actuator 110) according to the modification example 4 has a microcomputer 60. In the actuator 110, the drive signal generation unit 40 has a variable resistor that is independent of temperature and has a resistance controllable by an electric signal from the outside, that is, a so-called digital potentiometer R40, instead of the resistor R10. The digital potentiometer R40 is connected to the microcomputer 60, so that the resistance of the digital potentiometer R40 is arbitrarily settable by outputting a necessary signal from the microcomputer 60.

The microcomputer 60 obtains temperature information indicating the ambient temperature. For example, the microcomputer 60 has a temperature sensor (not illustrated in the drawing), and the temperature information obtained by the temperature sensor is inputted to the microcomputer 60. The temperature information may be inputted to the microcomputer 60 through a network such as the Internet or a LAN (local area network).

The microcomputer 60 has a storage device, such as ROM (read only memory) or RAM (random access memory), to store therein a table that provides the correspondences between the ambient temperature and the resistance of the digital potentiometer R40. The microcomputer 60 reads out of the table the resistance that corresponds to the ambient temperature indicated by the temperature information, and sets the resistance read out of the table as the resistance of the digital potentiometer R40. An element having a variable resistance, as described above, is not limited to the thermistor.

[Modification Example 5]

Figure 17:
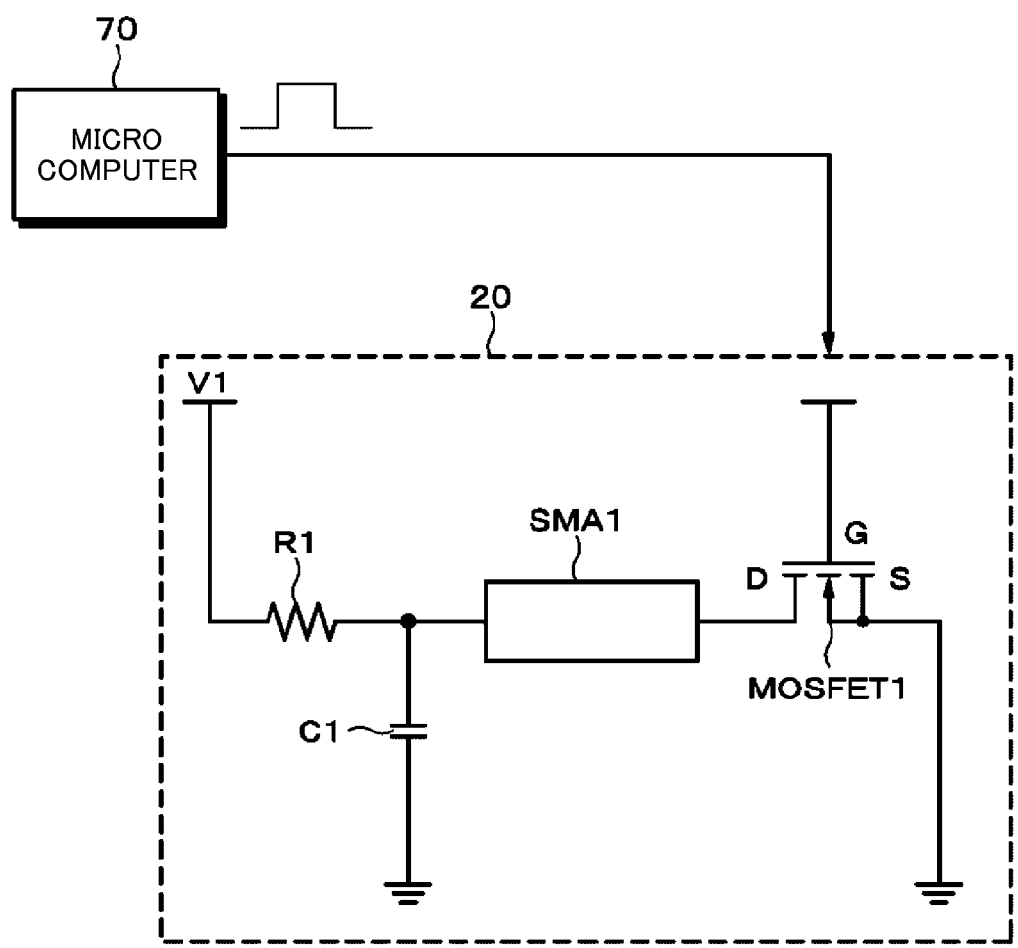
FIG. 17 is a diagram for explaining a modification example.

FIG. 17 is a diagram for explaining a modification example 5. An actuator (actuator 120) according to the modification example 5 has a microcomputer 70. The microcomputer 70 generates the drive signal (single pulse signal) for controlling the switching operation of the MOSFET1, and outputs the drive signal to the gate of the MOSFET1. Temperature information indicating the ambient temperature is inputted to the microcomputer 70.

The microcomputer 70 has a storage device such as ROM or RAM, to store therein a table that provides the correspondences between the ambient temperature and the duty ratio. The microcomputer 70 reads out of the table the duty ratio that corresponds to the ambient temperature indicated by the temperature information, and generates the single pulse signal having the read duty ratio. The single pulse signal generated by the microcomputer 70 is supplied to the MOSFET1 as the drive signal, and the switching operation of the MOSFET1 is controlled thereby. As described above, the microcomputer may be provided instead of the differentiating circuit, and the microcomputer may generate and output the single pulse signal the pulse width of which is controlled in an appropriate manner.

[Other Modification Examples]

The present invention can be variously modified, other than the modification examples described above. For example, the switching element is not limited to the N-channel type MOSFET, but a P-channel type MOSFET or a transistor may be used. Also, the configuration of a peripheral circuit may be modified as appropriate, such as that a portion to which the switching element is connected may be modified in accordance with the characteristics of the switching element.

In the embodiment described above, the electric current passes through the SMA for a period of time during which the switching element is turned on. However, the electric current may pass through the SMA for a period of time during which the switching element is turned off. The SMA is connected to a drive voltage source through the resistor and the capacitor in the above embodiment, but may be connected directly (capacitor-less) to the drive voltage source.

A plurality of capacitors may be mounted, and the amount of heat to be applied to the SMA may be varied by changing the number of the capacitors to be connected to the actuator (SMA) in accordance with the ambient temperature. A thermistor may be connected between the drive voltage source and the SMA. Also in this configuration, the electric current passing through the SMA can be controlled in accordance with the ambient temperature, resulting in stabilization in the acceleration of the actuator.

The configurations, methods, processes, forms, materials, values, and the like described in the above embodiment and modification examples are just examples, and configurations, methods, processes, forms, materials, values, and the like different from the above may be used as necessary. The configurations, methods, processes, forms, materials, values, and the like described in the above embodiment and modification examples may be combined with each other as long as no technical contradiction occurs.

Furthermore, the present invention can be embodied as, for example, a method, a program, or a recording medium having the program recorded therein, in addition to equipment.

REFERENCE SIGNS LIST

30 . . . signal generation unit
40 . . . drive signal generation unit
100 . . . actuator
MSFET1 . . . N-channel type MOSFET
SMA1 . . . shape memory alloy

The invention claimed is:

1. An impact producing actuator comprising:
a drive signal generation unit for generating a drive signal based on a single pulse signal generated in response to an input operation, and outputting the drive signal;
a switching element whose switching operation is controlled by the drive signal; and
a shape memory alloy through which electric current passes for a first period of time during which the switching element is turned on, and through which the electric current does not pass for a second period of time during which the switching element is turned off, wherein
the first period of time during which the switching element is turned on and the second period of time during which the switching element is turned off varies depending on an ambient temperature,
the drive signal generation unit comprises a differentiating circuit having a capacitor and a first resistor whose resistance varies depending on the ambient temperature,
the drive signal generation unit has an input terminal, an output terminal, and a common potential line; and
the capacitor is connected between the input terminal and the output terminal, and an intermediate point between the capacitor and the output terminal is connected to the common potential line through the first resistor.

2. A touch panel comprising:
an input unit for receiving an input operation;
a signal generation unit for generating a single pulse signal in response to the input operation;
a drive signal generation unit for generating a drive signal based on the single pulse signal and outputting the drive signal;
a switching element whose switching operation is controlled by the drive signal; and
a shape memory alloy through which electric current passes for a first period of time during which the switching element is turned on, and through which the electric current does not pass for a second period of time during which the switching element is turned off, wherein
the first period of time during which the switching element is turned on and the second period of time during which the switching element is turned off varies depending on an ambient temperature, and
wherein the drive signal generation unit comprises a differentiating circuit having a capacitor and a first resistor whose resistance varies depending on the ambient temperature,
the drive signal generation unit has an input terminal, an output terminal, and a common potential line; and
the capacitor is connected between the input terminal and the output terminal, and an intermediate point between the capacitor and the output terminal is connected to the common potential line through the first resistor.

3. An impact producing actuator comprising:
a drive signal generation unit for generating a drive signal based on a single pulse signal generated in response to an input operation, and outputting the drive signal;
a switching element whose switching operation is controlled by the drive signal; and
a shape memory alloy through which electric current passes for a first period of time during which the switching element is turned on, and through which the electric current does not pass for a second period of time during which the switching element is turned off, wherein
the first period of time during which the switching element is turned on and the second period of time during which the switching element is turned off varies depending on an ambient temperature,
wherein current passes through the shape memory alloy only during the input operation,
wherein the shape memory alloy remains at ambient temperature during the input operation, and
wherein the drive signal generation unit comprises a differentiating circuit having a capacitor and a first resistor whose resistance varies depending on the ambient temperature.

4. The impact producing actuator according to claim 3, wherein:
the drive signal generation unit has an input terminal, an output terminal, and a common potential line; and
the capacitor is connected between the input terminal and the output terminal, and an intermediate point between the capacitor and the output terminal is connected to the common potential line through the first resistor.

* * * * *